United States Patent
Nakahira et al.

(10) Patent No.: US 8,582,021 B2
(45) Date of Patent: Nov. 12, 2013

(54) LENS UNIT, CAMERA BODY, AND CAMERA DEVICE WHICH DETERMINES WHETHER THE ACCUMULATED EXPOSURE TIME IS ABOVE A VALUE

(75) Inventors: Toshiaki Nakahira, Yokohama (JP); Keiji Himuro, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 395 days.

(21) Appl. No.: 12/912,173

(22) Filed: Oct. 26, 2010

(65) Prior Publication Data

US 2011/0109768 A1 May 12, 2011

(30) Foreign Application Priority Data

Nov. 10, 2009 (JP) ................................. 2009-256902

(51) Int. Cl.
*H04N 5/76* (2006.01)

(52) U.S. Cl.
USPC ....................... 348/362; 348/229.1; 348/231.6

(58) Field of Classification Search
None
See application file for complete search history.

(56) References Cited

U.S. PATENT DOCUMENTS

| | | | |
|---|---|---|---|
| 3,792,648 A * | 2/1974 | Ishiguro | 396/240 |
| 6,798,456 B1 * | 9/2004 | Sato | 348/362 |
| 7,180,543 B2 | 2/2007 | Ojima et al. | |
| 7,187,409 B2 | 3/2007 | Nakahira et al. | |
| 7,274,392 B2 * | 9/2007 | Wakabayashi et al. | 348/243 |
| 7,388,607 B2 | 6/2008 | Nakahira | |
| 7,471,321 B2 | 12/2008 | Ojima et al. | |
| 7,489,356 B2 | 2/2009 | Nakahira | |
| 7,589,778 B2 | 9/2009 | Nakahira | |
| 7,656,457 B2 | 2/2010 | Ojima et al. | |
| 2001/0028793 A1 * | 10/2001 | Ishihara et al. | 396/233 |
| 2003/0048366 A1 * | 3/2003 | Kondo | 348/231.99 |
| 2007/0003261 A1 * | 1/2007 | Yamasaki | 396/55 |
| 2007/0077062 A1 * | 4/2007 | Senba et al. | 396/529 |
| 2007/0165133 A1 * | 7/2007 | Shmizu et al. | 348/362 |
| 2007/0285542 A1 * | 12/2007 | Suzuki | 348/294 |
| 2008/0084487 A1 * | 4/2008 | Yoshida | 348/243 |
| 2009/0115869 A1 | 5/2009 | Ojima et al. | |
| 2009/0153723 A1 * | 6/2009 | Okamoto | 348/333.13 |
| 2009/0208194 A1 * | 8/2009 | Honjo et al. | 396/55 |
| 2010/0208108 A1 | 8/2010 | Nakahira | |

FOREIGN PATENT DOCUMENTS

| | | |
|---|---|---|
| JP | 2000-183322 | 6/2000 |
| JP | 2005-140914 | 2/2005 |
| JP | 2008-98818 | 4/2008 |

OTHER PUBLICATIONS

U.S. Appl. No. 08/738,903, filed Oct. 28, 1996, Hiroyoshi Awata, et al.

* cited by examiner

*Primary Examiner* — James Hannett
*Assistant Examiner* — Dwight C Tejano
(74) *Attorney, Agent, or Firm* — Oblon, Spivak, McClelland, Maier & Neustadt, L.L.P.

(57) ABSTRACT

A camera device includes a lens unit and a camera body detachable from the lens unit a communication interface communicably connecting the lens unit and the camera body. The lens unit includes an optical system, a diaphragm controller, an imaging portion including an image sensor, an image processor, a storage medium in which an accumulated exposure time and a limit exposure time of the image sensor are stored. The camera body includes a determiner portion which determines whether or not the accumulated exposure time is over the limit exposure time, and a notifying portion which notifies that the accumulated exposure time is over the limit exposure time when the determiner portion determines that the accumulated exposure time is over the limit exposure time.

9 Claims, 9 Drawing Sheets

LENS UNIT, CAMERA BODY, AND CAMERA DEVICE WHICH DETERMINES WHETHER THE ACCUMULATED EXPOSURE TIME IS ABOVE A VALUE

CROSS REFERENCE TO RELATED APPLICATION

The present application is based on and claims priority from Japanese Patent Application No. 2009-256902, filed on Nov. 10, 2009, the disclosure of which is hereby incorporated by reference in its entirety.

BACKGROUND OF THE INVENTION

1. Field of the Invention

The present invention relates to a camera device comprising a lens unit and a camera body. In particular, it relates to a camera device which can properly manage an accumulated exposure time of each image sensor and accurately determine a deterioration level of the image sensor according to actual usage environment, as well as to a lens unit and a camera body constituting such a camera device.

2. Description of the Related Art

A single lens reflex digital camera is well known for a type of lens interchangeable camera devices. It generally incorporates an image sensor in a camera body in which a photographic lens is mounted. However, one having an image sensor in a lens unit is also known (disclosed in Japanese Patent Application Publication No. 2008-98818, for example).

A camera device having an image sensor in a camera body has an advantage of cost reduction since the number of mountable image sensors is one. Meanwhile, a camera device having an image sensor in a lens unit has an advantage of extensibility since a lens unit including an optimal, most advanced image sensor can be used and at the same time another image sensor can be also mounted in a camera body.

In capturing a subject image with a digital camera or previewing the image on a display of the camera body, a shutter is open. An image sensor is exposed to ambient light with the shutter open, that is, not only during a shooting operation but also during turning-on of the power source.

The image sensor (photo transistor, for example) is sufficiently tolerative to exposure, however, a color filter attached to the front of the image sensor is not and it degrades due to exposure over time (disclosed in Japanese Patent Application Publication No. 2000-183322, for example). Color degradation of the color filter causes the color of a captured image to blur and deteriorates the image quality.

For prevention of this problem, it is a good way to detect degradation of the color filter before the degradation is advanced over a certain level and notify a user of the degradation and time for replacement. A type of digital camera incorporating an image sensor in a camera body can relatively easily count accumulated exposure time of the image sensor to determine when the image sensor should be replaced. To the contrary, another type of digital camera incorporating an image sensor in a lens unit needs to distinctly store accumulated exposure time of each lens unit (each image sensor) for determining the time for replacement in the camera body. To perform such data management and storage, it is necessary for the camera body to comprise sufficient memory areas and function. Moreover, further contrivances are required to distinctly manage and store accumulated exposure times of different lens units which include the same image sensors.

Another problem is that since an operative element as keys or a display unit as an LCD is mounted in the camera body irrespective of the type of a lens unit, the camera body has to comprise a function to manage and process information on each image sensor and to notify degradation of the color filter and display the notification. However, there is no prior art technique or device which deals with such a problem.

Furthermore, amount of light incident on the image sensor changes depending on a photographic condition so that it is not possible to accurately determine degradation of the image sensor simply from stored accumulated exposure time. Prior art techniques fail to address how to accurately determine degradation of the image sensor.

SUMMARY OF THE INVENTION

The present invention aims to provide a camera device which can properly manage accumulated exposure time of each image sensor, accurately determine degradation level of the image sensor in accordance with actual use environment, and accurately determine time for replacement of the image sensor having a color filter degraded by exposure. The present invention also aims to provide a lens unit and a camera body which constitute such a camera device.

According to one aspect of the present invention, a camera device comprising a lens unit and a camera body detachable from the lens unit, comprises a communication interface communicably connecting the lens unit and the camera body; the lens unit comprising an optical system including a lens; a diaphragm controller which operates a shutter and controls a diaphragm amount; an imaging portion including an image sensor which photo-electrically converts light from a subject having transmitted through the lens; an image processor which generates image data from an output of the imaging portion; and a storage medium in which an accumulated exposure time and a limit exposure time of the image sensor are stored, the accumulated exposure time being a time obtained by adding a time for which the shutter is open; and the camera body comprising a determiner portion which determines whether or not the accumulated exposure time is over the limit exposure time; and a notifying portion which notifies that the accumulated exposure time is over the limit exposure time when the determiner portion determines that the accumulated exposure time is over the limit exposure time.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENT

Hereinafter, embodiments of the present invention will be described in detail with reference to the accompanying drawings.

First Embodiment

Figure 1A:
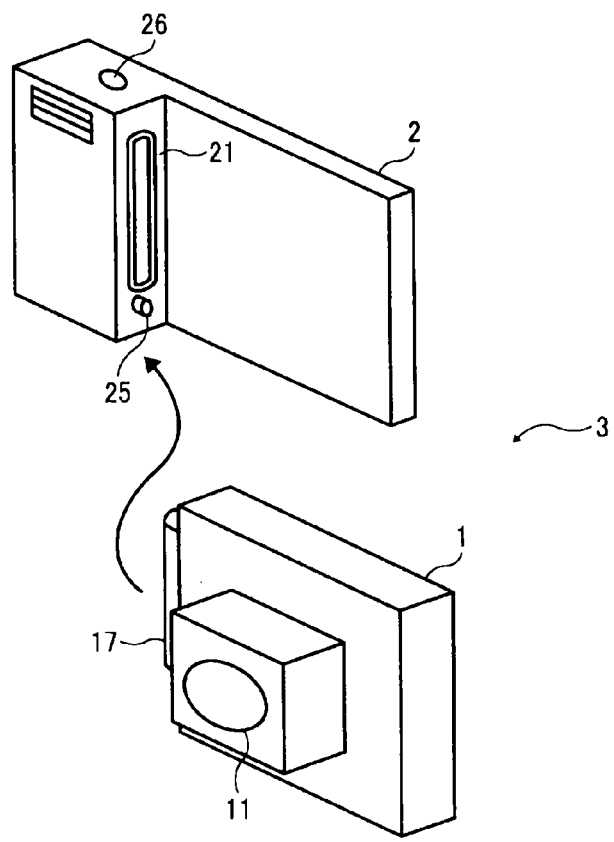
FIG. 1A is a perspective view of one example of a lens unit and a camera body and FIG. 1B is a perspective view of a back side of the camera body according to one embodiment of the present invention.
Figure 1B:
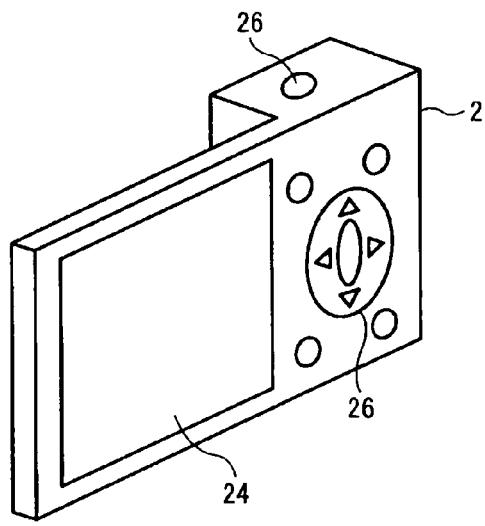

FIG. 1A is a perspective view of a lens unit 1, a camera body 2 detachable from the lens unit 1, and a camera device 3 in which the lens unit 1 is attached to the camera body 2. FIG. 1B is a perspective view of the back side of the camera body 2. The lens unit 1 in FIG. 1A comprises an optical system 11 including an imaging lens on the front face (bottom left of the drawing) and a connector as a communication interface 17 at the right end (top left in the drawing). The camera body 2 comprises a stroboscopic unit on the front face, a shutter button as an operation portion 26 on the top face, and a connector as a communication interface 21 with the lens unit 1 to face the connector of the lens unit 1. It also comprises a detection switch as an insertion detector 25 in the vicinity of the connector to detect attachment of the lens unit 1.

As shown in FIG. 1B, the camera body 2 comprises a liquid crystal display (LCD) as a display unit 24 and various operation switches as a part of the operation unit 26 on the back face.

Figure 2:
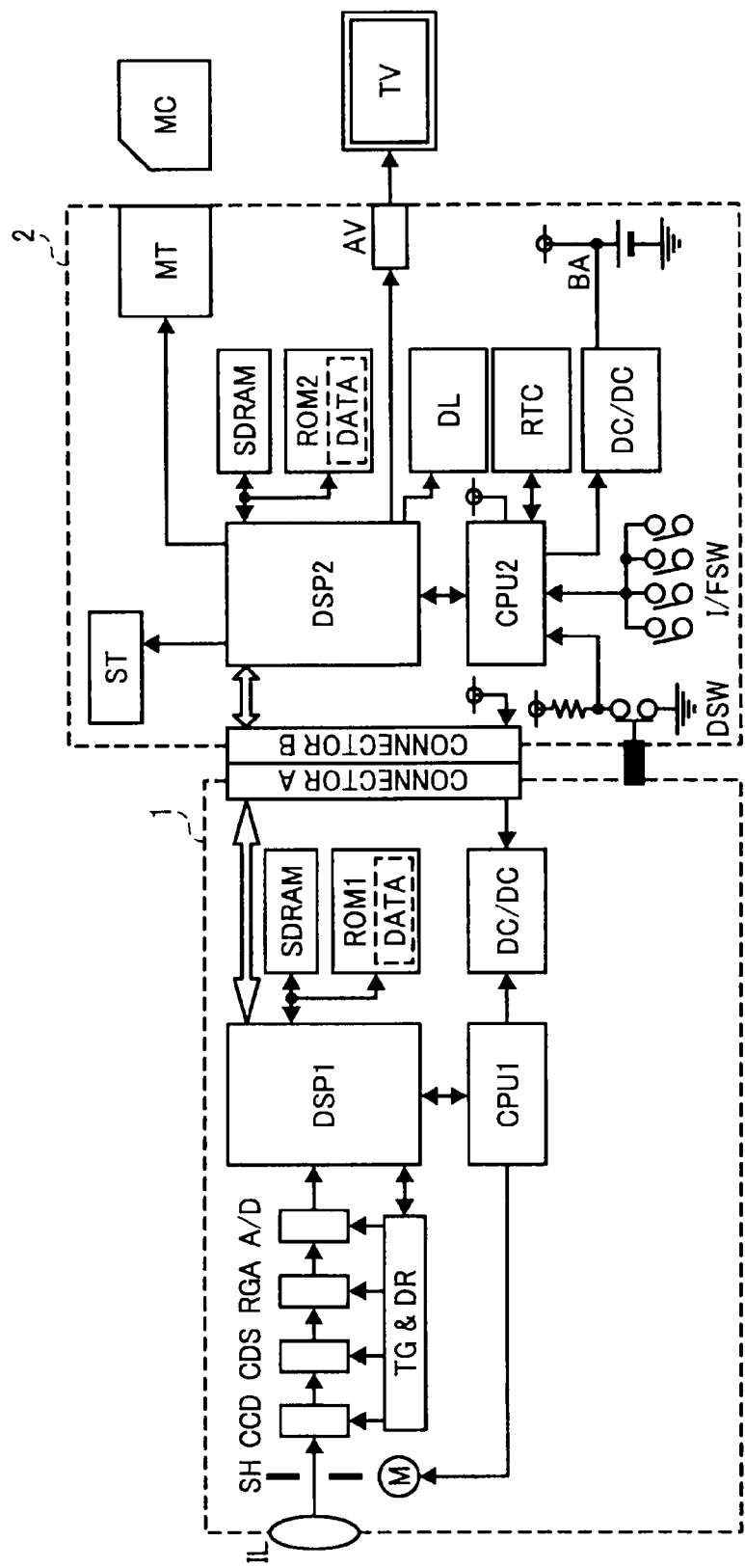
FIG. 2 is a block diagram showing an example of hardware structure of the camera body and the lens unit constituting the camera device according to one embodiment of the present invention.

Next, the hardware structure of the camera device 3 according to the present embodiment will be described with reference to FIG. 2. In the drawing a connector A of the lens unit 1 and a connector B of the camera body 2 are fitted into each other to integrate the camera device 3. The connector A constitutes a communication interface 17 while the connector B constitutes a communication interface 21.

The lens unit 1 (interchangeable lens unit) comprises an imaging lens IL, a shutter SH, a motor M to control the shutter and diaphragm amount, a CCD as an image sensor outputting captured data according to light from a subject, a CDS, a programmable gain amplifier PGA, an A/D converter, a data signal processor DSP1 performing predetermined image processing to captured data to generate image data, an SDRAM to temporarily store image data processed by the DSP1, an ROM 1 to store information on operation of the lens unit 1, a CPU1 controlling the total operation of the lens unit 1, and a DC/DC converter supplied with power source from the camera body 2 to convert it into necessary power source for the lens unit 1.

The camera body 2 comprises a DSP2 performing predetermined image processing to image data generated in the lens unit 1 to store it as an image file or display the image data on a display DL, a stroboscopic unit ST, an SDRAM to store image files, a memory card throttle MT to mount an external memory, an AV jack AV to output image data to an external display device, an ROM2 storing information on operation of the camera body 2, a CPU2 controlling the total operation of the camera body 2, a DC/DC converter supplied with power source from a battery BA to convert it to necessary power source for operation of the camera body 2 and the lens unit 1, a user interface switch I/F SW as an operation switch, an insertion detection switch DSW to detect that the lens unit 1 is attached to the camera body 2.

Figure 3:
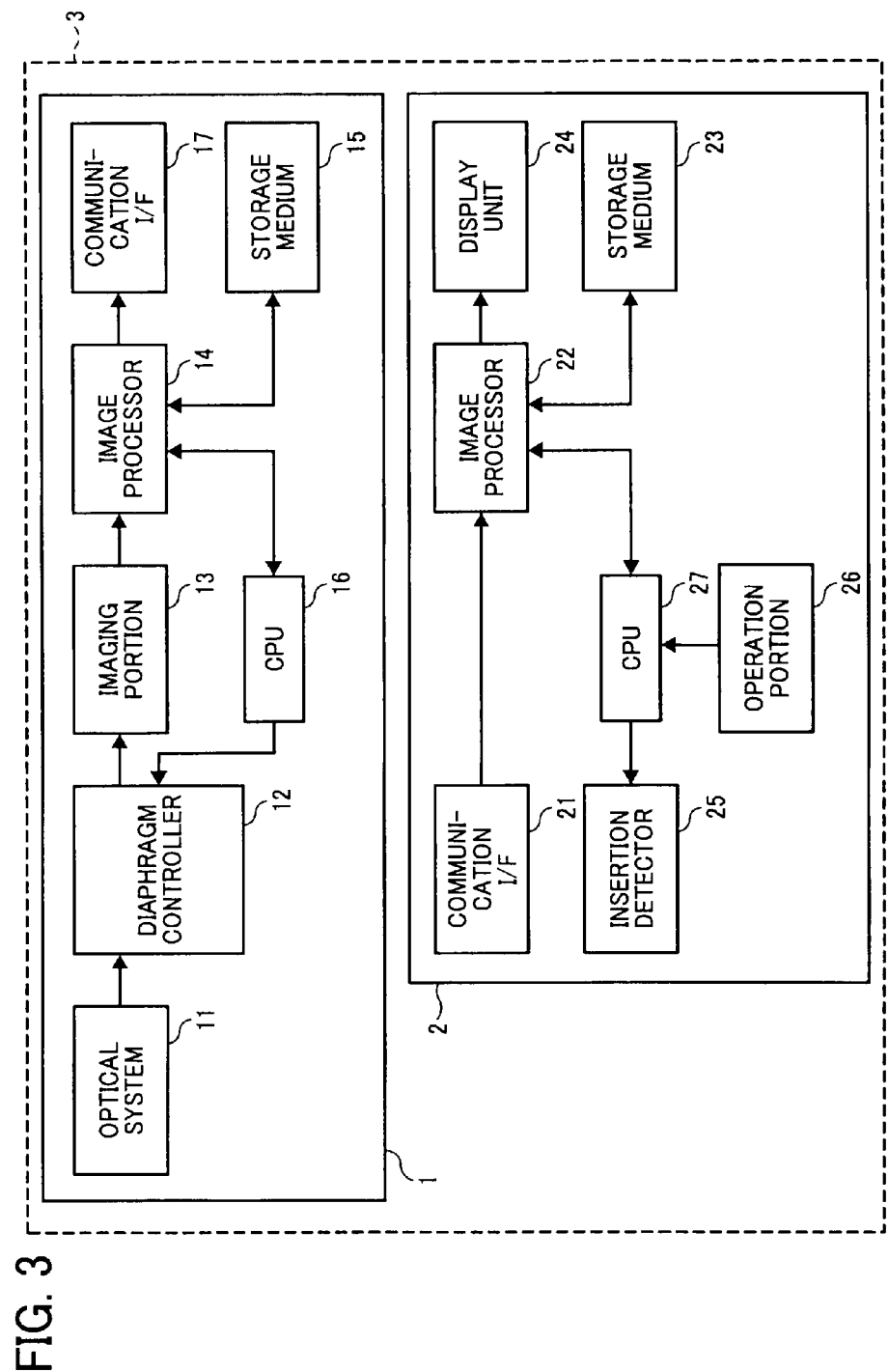
FIG. 3 is a block diagram showing an example of function structure of the camera body and the lens unit constituting the camera device according to one embodiment of the present invention.

Next, the camera device according to the present embodiment will be described with reference to FIG. 3. FIG. 3 is a function block diagram of the camera device which is achieved by software stored in the storage medium of each of the lens unit 1 and the camera body 2 and by hardware shown in FIG. 2.

In FIG. 3 the lens unit 1 comprises an optical system 11 including a photographic lens, a diaphragm controller 12 including a shutter and an aperture control system to operate in response to a predetermined shooting instruction and capture light from a subject to an imaging portion 13, the imaging portion 13 including an image sensor to photo-electrically convert an optical image of the subject obtained via the optical system 11 and the shutter for outputs, an image processor 14 generating image data from an output of the imaging portion 13, a storage medium 15 in which accumulated exposure time, limit exposure time, degradation flag, and replacement flag are stored, a CPU 16 controlling the entire operation of the lens unit 1, and a communication interface (hereinafter, communication I/F) 17 including a connector to communicably connect with the camera body 2. The accumulated exposure time is accumulatively added exposure time of the image sensor and the limit exposure time indicates a threshold value of degradation of the image sensor exposed under a predetermined exposure condition. The degradation flag indicates that the accumulated exposure time approaches threshold data which bases on the limit exposure time while the replacement flag indicates that the accumulated exposure time is equal to or over the threshold data.

In FIG. 3, the camera body 2 comprises a communication I/F 21 communicably connecting with the lens unit 1, an image processor 22 performing a predetermined image processing to image data sent from the lens unit 1 to generate an image file, a storage medium 23 in which accumulated exposure time, limit exposure time, degradation flag, and replacement flag are stored, a CPU 16 controlling the entire lens unit 1, a display unit 24 displaying a state of the image sensor determined from the image data from the lens unit 1 or the replacement flag or the degradation flag, an insertion detector 25 which detects attachment/detachment of the lens unit 1, an operation unit 26 which detects various settings of the camera device 3 and imaging operations in accordance with manipulations to operation keys and notifies a CPU 27 of them, and the CPU 27 which controls the entire operation of the camera body 2. The accumulated exposure time is accumulatively added exposure time of the image sensor and the limit exposure time indicates a threshold value of degradation of the image sensor exposed under a predetermined exposure condition. The degradation flag indicates that the accumulated exposure time approaches threshold data which bases on the limit exposure time while the replacement flag indicates that the accumulated exposure time is equal to or over the threshold data.

Note that the CPU 16 functions as a determiner portion and a notifying portion of the lens unit 1 and the CPU27 functions as a determiner portion and a notifying portion of the camera body 2.

The power supply of the camera device 3 is provided by a battery mounted in the camera body 2. The power supply of the lens unit 1 is provided from the camera body 2 via the communication I/F 17.

The insertion detector 25 as shown in FIG. 1A is a pin-like member protruding from the end of the camera body 2. When the lens unit 1 is attached to the camera body 2, the insertion detector 25 is pushed into the camera body 2 and the CPU 27 thereby detects the attachment of the lens unit 1.

Next, operation of the camera device 3 according to the present embodiment is described by way of example. The camera device 3 can manage quality of the image sensor which includes a color filter where color degradation occurs when exposure time is over a certain length of time. The color degradation adversely affects quality of images. In the following embodiments, how to detect level of color degradation of the color filter in the camera device 3 will be described.

Figure 4:
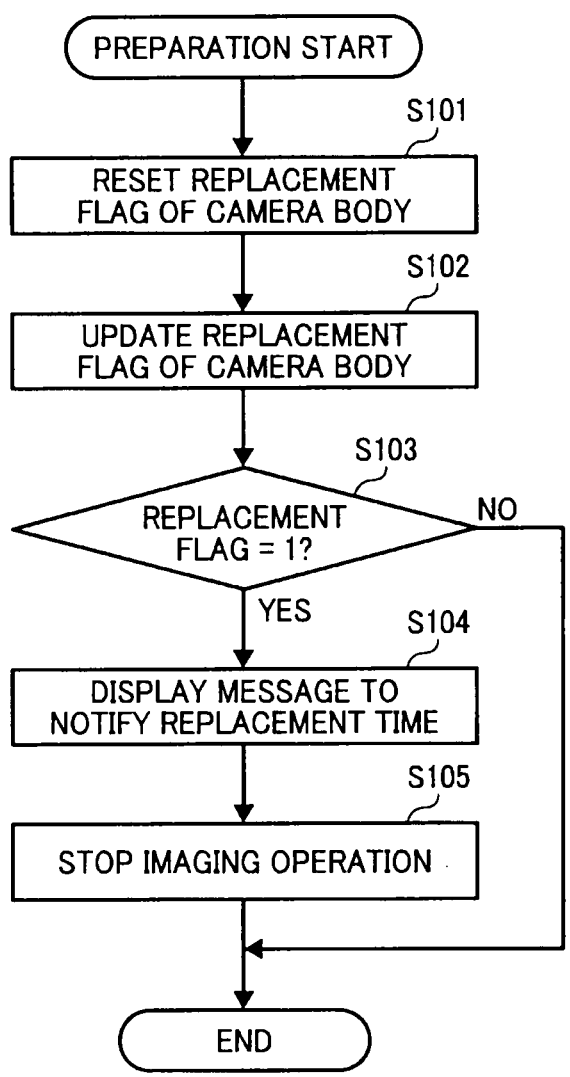
FIG. 4 is a flowchart showing an example of shooting preparation process of the camera device.

An example of how degradation of the color filter is detected is described with reference to a flowchart in FIG. 4. FIG. 4 shows a flow of shooting preparation process executed when the lens unit 1 is attached to the camera body 2 and power is turned on (when the camera device 3 starts operation).

In step S101, upon a start of shooting preparation process, a replacement flag stored in the storage medium 23 of the camera body 2 is reset. Resetting the replacement flag refers to setting a value thereof to zero, for example. Next, a replacement flag stored in the storage medium 15 of the lens unit 1 is read and the one stored in the storage medium 23 is overwritten with the read replacement flag in step S102.

Next, in step S103 using the updated replacement flag, a determination is made on whether or not it is time for the color filter of the image sensor of the imaging portion 13 to start degrading, that is, it is time for replacement of the image sensor. Herein, the value of the replacement flag is set to 1 when it is time for the color filter to start degrading while that is set to zero when it is not yet time for the color filter to start degrading, for example.

At the replacement flag being 1 (Yes in step S103), the display unit 24 displays such a message that "it is time to replace the image sensor" to notify a user of start of degradation of the color filter and necessity for replacement of the image sensor in step S104. In step S105 a processing for inhibiting shooting related operation is performed after display of the message. The inhibiting processing refers to controlling the operation of the camera device 3 so as not to store a subject image as image data even with a press to the shutter button, for example.

At the replacement flag being zero (No in step S103), the shooting preparation ends. Upon completion of the shooting preparation, the camera device 3 is shifted into a preview mode in which image data generated from a subject image obtained via the optical system 11 is periodically displayed on the display unit 24.

The message display in step S104 and the inhibiting of the shooting operation in step S105 are executed according to a result of the determination in step S103 in the present embodiment. However, it can be configured to execute only one of them. Further, instead of executing the inhibiting processing in step S105 after the message display in step S104, another message display can be done. For example, after displaying the message to indicate when to replace the image sensor in step S104, a message that captured image data may not be reproduced in color normally from now on can be displayed.

The above processing is related to the shooting preparation after the camera device is powered on in the present embodiment. However, it can be performed when the lens unit 1 is detached from the camera body while the power is on and then attached thereto again. In this case the processing in steps S101 to S105 can be executed upon detection of the attachment of the lens unit by the insertion detector 25. Alternatively, if the camera device 3 is configured to be able to detect attachment/detachment of the lens unit 1 by the insertion detector 25 even during turning-off of the power supply, the shooting preparation process can be completed without the above operation when the insertion detector 25 does not detect attachment of the lens unit at power-on.

Figure 5:
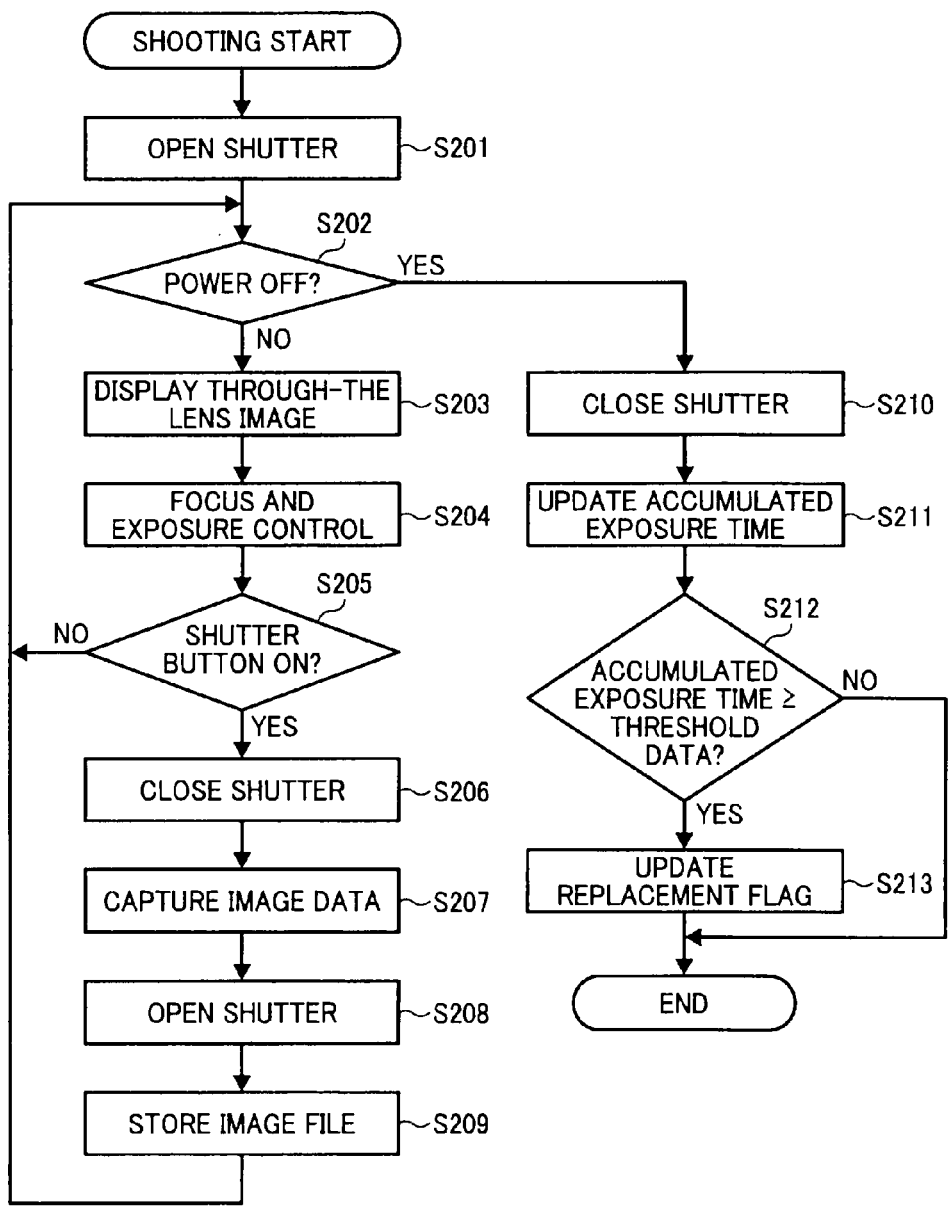
FIG. 5 is a flowchart showing an example of a process in which replacement time for an image sensor is managed in the camera device.

Next, a processing for setting the replacement flag in the storage medium 15 of the lens unit 1 is described in detail with reference to FIG. 5. When the shooting preparation process is completed and the camera device 3 is in the preview mode, the shutter is opened first in step S201. Then, until the power is turned off (No in step S202), a through-the-lens image is displayed in step S203. A not-shown focus control system in the optical system 11 controls focus and exposure in step S204. The operation in steps S201 to S204 is repeated until a start of imaging process is instructed by a predetermined manipulation to the shutter button (No in step S205). The predetermined manipulation refers to, for example, pressing the shutter button to start the imaging process.

When the predetermined manipulation is done to the shutter button (Yes in step S205), the shutter is closed in step S206. Image data is obtained from a subject image via the optical system 11 and the imaging portion 13 in step S207. The shutter is opened again after the completion of capturing image data in step S208. Then, the image processor 14 of the lens unit 1 or the image processor 22 of the camera body 2 performs predetermined image processing on the captured image data to store it in a not-shown memory card of the camera body 3 as an image file in step S209. Note that the re-opening of the shutter in step S208 can be done after completion of the image file storing in step S209. After storing the image file in step S209, the flow returns to step S203.

Upon start of the shooting operation, when the power is turned off (Yes in step S202) after the shutter is opened in step S201, the shutter is closed in step S210. In step S211 an accumulated exposure time previously stored in the storage medium 15 is updated by adding a time taken for executing the steps S201 to S210. The updated accumulated exposure time is stored in the storage medium 15. Next, a determination is made on whether or not the accumulated exposure time newly stored in the storage medium 15 is over threshold data (limit exposure time) pre-stored in the storage medium 15 in step S212. At the accumulated exposure time being over the threshold data (Yes in step S212), the replacement flag stored in the storage medium 15 is set to 1 in step S213. At the accumulated exposure time being not over the threshold data (No in step S212), the replacement flag in the storage medium 15 is set to zero and the flow is completed. Note that the determining processing in step S212 can be executed by either the CPU 17 of the lens unit 1 or the CPU 27 of the camera body 2.

Now, the accumulated exposure time of the camera device 3 according to the present embodiment is described. The accumulated exposure time is accumulated data of elapsed time from the shutter opening in step S201 to the shutter closing in step S210 stored in the storage medium 15. In other words, it is a total time during which the image sensor is exposed from the shutter opening.

It is well known that the color filter of the image sensor degrades as the exposure time of the image sensor increases. Color degradation of the color filter occurs differently depending on how the color filter is manufactured. The color filter is manufactured by printing with dye ink or pigment ink, coating with ultraviolet absorbent, or using a microlens, for example.

A color filter printed with dye ink exerts high color purity but low light resistance while a color filter printed with pigment ink exerts high light resistance but low color purity. Thus, various types of the color filter are usable for the image sensor so that the limit exposure time for detection of degradation level of the color filer differs among image sensors. For example, limit exposure time of an image sensor including a dye based color filter is about 360 hours, and that of the image sensor including a pigment based color filter is about 500 hours. The limit exposure time is in other words longevity of the image sensor.

This longevity is a time taken for the color filter to degrade when exposed at a certain luminance. Accordingly, it is not possible to obtain an accurate limit exposure time to compare the accumulated exposure time and the limit exposure time unless intensity of light actually illuminated is considered. For example, with a camera device having sensitivity of ISO100, at brightness of ambient light being Lv (light value) 12, intensity of light illuminating the image sensor, that is, light reaching the imaging portion 13 via the optical system 11 differs depending on F-number of an imaging lens of the optical system 11.

With the above considered, the camera device according to the present embodiment is configured to include a corrective calculator executed by the CPU 16 in order to perform a predetermined correction to the shutter opening time and calculate accurate exposure time using a result of the correction. In the following the correction process will be described. Reference exposure time is determined and stored in the storage medium 15 in advance. Reference exposure time refers to limit exposure time in a reference exposure state in which ambient light is defined to be at Lv 12 and maximum aperture to be 2.0.

In actual imaging operation the maximum aperture does not always set the reference exposure state. However, exposure time accounts for time taken for a single imaging process much less than a preview time (during which through-the-lens images are displayed), and in many cases through-the-lens image data are displayed using both the maximum aperture in a preview mode as F-number and an electronic shutter which controls accumulated light amount per unit time. Accordingly, it is appropriate to calculate the accumulated exposure time using the maximum aperture as F-number.

Further, intensity of ambient light greatly changes depending on a shooting condition. With this taken into consideration, the actual exposure time from the shutter opening to closing is converted to the exposure time in the reference exposure state, using the exposure control data during the preview mode. The converted exposure time is added to the accumulated exposure time. Accordingly, more accurate accumulated exposure time can be obtained relative to the limit exposure time determined according to the reference exposure state, making it possible to accurately detect the level of degradation of the color filter.

The converted exposure time T accumulatively added since the opening of the shutter can be calculated by the following expression:

$$T = 2^{(Lvx-LvR)} \times 2^{(AvR-Avx)} \times t$$

where LvR is intensity of ambient light in the reference exposure state, AvR is F-number in the reference exposure state, t is actual exposure time, Lvx is average brightness during exposure, and Avx is the maximum aperture during exposure.

For example, when LvR is Lv12, F-number is 2.0, actual exposure time is 1 hour, average brightness (Lvx) is Lv14, and maximum aperture (Avx) is 2.8, the converted exposure time is calculated by $2^{(14-12)} \times 2^{(2-3)} \times 1$ to 2 hours. In this example, although the shutter opening time is 1 hour, the accumulated exposure time is 2 hours. It is thus possible to accurately detect the level of degradation of the image sensor by adding the corrected exposure time to the accumulated exposure time.

There is a case where property of the color filter sharply degrades when it is exposed to extremely bright light such as sunlight. In such a case, the reference exposure state can be set in accordance with property of the color filter experimentally obtained to calculate the actual exposure time using the above expression.

Second Embodiment

Next, another example of setting the replacement flag in the camera device according to the second embodiment is described with reference to a flowchart in FIG. 6.

Figure 6:
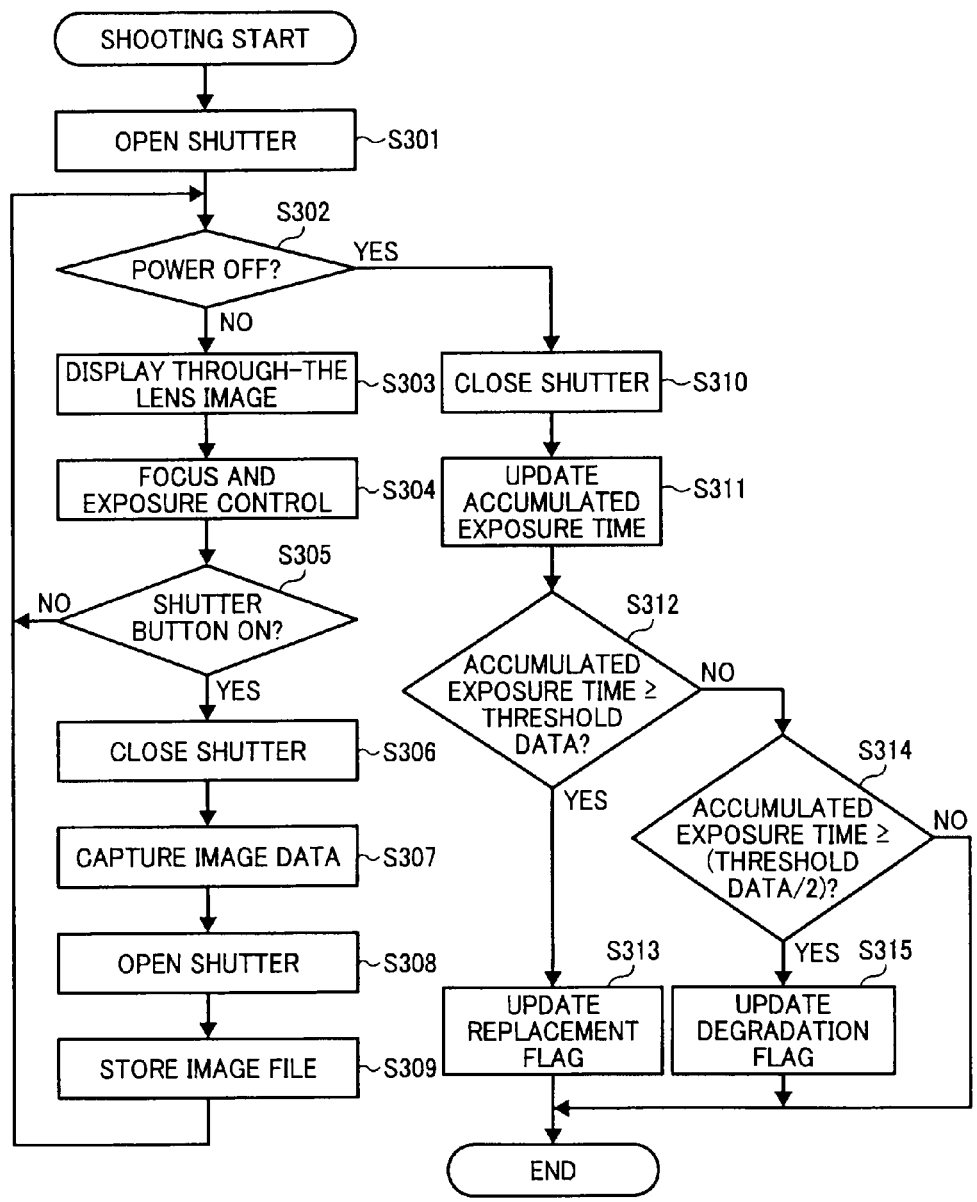
FIG. 6 is a flowchart showing another example of the managing process for replacement time of the image sensor.

In FIG. 6 steps S301 to S312 correspond to steps S201 to S212 in the first embodiment. Therefore, a description of the same processes as those in the first embodiment will be omitted and only a difference from the first embodiment will be described.

After updating the accumulated exposure time in step S311, a determination is made on whether or not the accumulated exposure time is over threshold data (limit exposure time) in step S312. At the accumulated exposure time being over the threshold data (Yes in step S312), the replacement flag stored in the storage medium 15 is set to 1 in step S313.

At the accumulated exposure time being not over the threshold data (No in step S312), a determination is made on whether or not the accumulated exposure time is over a half of the threshold data (limit exposure time) in step S314, for example. At the accumulated exposure time being over a half (50%) of the threshold data (Yes in step S314), the replacement flag stored in the storage medium 15 is not changed and a degradation flag is set to 1 and stored in the storage medium 15 in step S315.

Note that although a threshold value used in the determining process in step S314 is set to a half of the threshold data by way of example, the present embodiment is not limited to such a value. An arbitrary value can be set as long as degradation can be notified before the limit exposure time (time for replacement of the image sensor) has elapsed or the accumulated expose time exceeds the threshold data. Specifically, a threshold value for updating the degradation flag can be 80% of the threshold data. Alternatively, setting the threshold value can be done in plural steps. In this case the same steps as steps S314-S315 need be added by the number of value setting steps.

Third Embodiment

Figure 7:
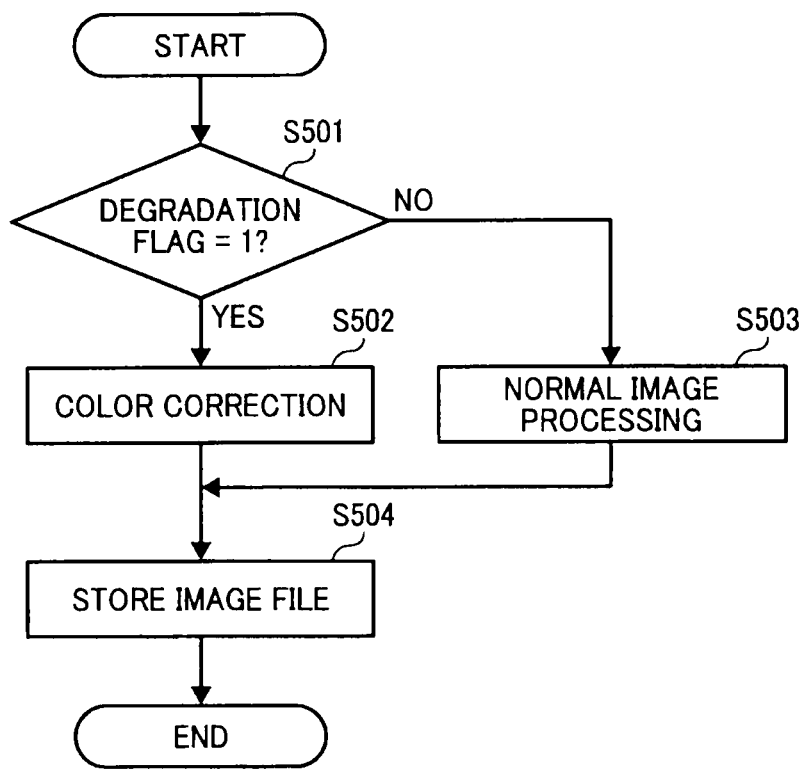
FIG. 7 is a flowchart showing an example of image color correction process of the camera device.

Next, an image processing executed when the degradation flag is set will be described with reference to a flowchart in FIG. 7.

The image processing in the present embodiment concerns the image file storing process in step S209 in the first embodiment. First, a value of the degradation flag is checked in step S501. The degradation flag is set to 1 when a ratio of the accumulated exposure time relative to the threshold data reaches a certain ratio while it is set to zero until the ratio reaches the certain ratio. Thus, in step S501 a determination is made on whether or not the degradation flag is set to 1.

At the degradation flag being 1 (Yes in step S501), color correction is executed in step S502. At the degradation flag being not 1 (No in step S501), normal image processing is executed. The color correction in step S502 is a processing executed by the image processor 14 by which 3 original colors (blue, green, red) of image data output from the imaging portion 13 are corrected in each color in plural steps.

After execution of the color correction (step S502) or normal image processing (step S503), an image file in question is stored in the storage medium 23 of the camera body 2 in step S504.

Next, an example of the color correction (step S502) is described with reference to a flowchart in FIG. 8. In the image sensor according to the present embodiment, each color correction is done in 3 levels (high, medium, low), and color degradation due to ultraviolet light is larger in order of blue, green, and red. When the accumulated exposure time accounts for 50 to 66% of the threshold data, a first color correction in which only blue color is corrected in the first level (low) is executed in steps S601-S602. When the accumulated exposure time accounts for 67 to 87% of the threshold data, a second color correction in which the blue color is corrected in the second level (medium) and green color is corrected in the first level is executed in steps S601, S603. Further, when the accumulated exposure time accounts for 87% or more of the threshold data, a third color correction in which the blue color is corrected in the third level (high), the green color in the second level, and red color in the first level is executed in steps S601, S604.

In the present embodiment, the threshold values to determine which one of the first to third color correction to execute is not limited to be in the range of the above-described values. They can be other values arbitrarily decided. Further, the color correction can be performed by either the image processor 14 of the lens unit 1 or the image processor 22 of the camera body 2.

Figure 9A:
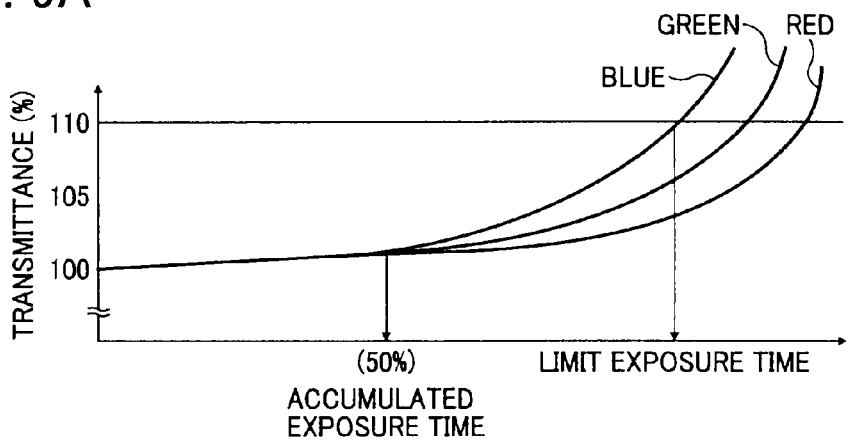
FIGS. 9A to 9C show examples of color degradation of color filters mounted on the image sensor.
Figure 9B:
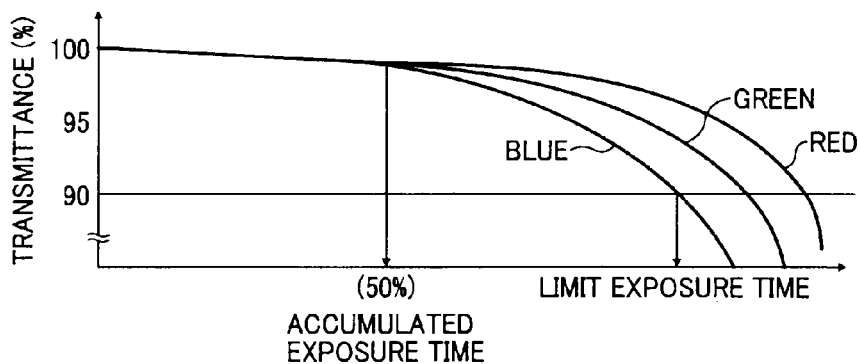
Figure 9C:
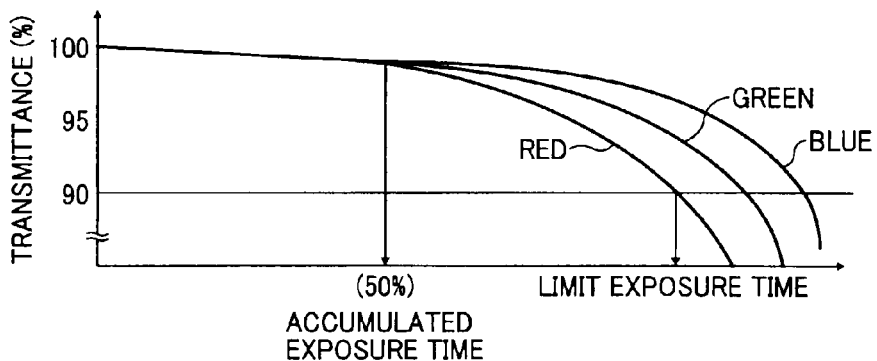

Next, the degradation of the color filter of the image sensor included in the camera device according to the present embodiment is described with reference to FIGS. 9A to 9C. FIGS. 9A to 9C are graphs showing examples of color degradation and abscissa axes thereof show the accumulated exposure time and vertical axes show optical transmittance of the color filter when white light of predetermined intensity is irradiated and initial transmittance is defined to be 100.

The image sensor comprises a transparent resin layer including a microlens, a color filter, a light receiving portion as well as an ultraviolet absorbing layer, a planarized film and a passivation layer. One of the color degradation of the color filter is decoloration and transparency of a specific color. With an increase in the accumulated exposure time, amount of light blocked by the color filter decreases so that transmittance of the three colors rises with time as shown in FIG. 9A. Thus, an increase in the accumulated exposure time causes the color filter to become transparent gradually, and as a result, light with a wavelength other than those of the three colors (blue, green, red) can transmit through the color filter.

Another example of the degradation of the color filter is a decrease in the transmittance due to the accumulated exposure time. One example, as shown in FIG. 9B, is that with an increase in the accumulated exposure time, an element other than the color filter such as a transparent resin layer may show a decrease in the transmittance, degradation of the other element in addition to the color filter causes degradation (decoloration) of the three colors in order of blue, green, red. Alternatively, the order in which color degradation occurs may be red, green, and blue, as shown in FIG. 9C.

As described above, various types of color degradation occur depending on the structure or materials of the image sensor so that a relation between amount of irradiated light and accumulated exposure time need be determined through experiments. General light resistance of the dye and pigment types of color filter is described above. Note that the limit exposure time is defined to be time taken for a color filter most susceptible to a change of the accumulated exposure time to change in property at a predetermined change rate.

FIGS. 9A to 9C show examples of times for a change in the transmittance as limit exposure time to reach 10%. However, the limit exposure time of the camera device according to the present embodiment should not be limited to such examples. It can be arbitrarily set in accordance with required specification of a camera device in question. That is, required specifications for a professional-use camera device which is desired to create images with high reproducibility and for a beginner type camera device are completely different. Threshold values should be therefore set in accordance with the respective camera types. Furthermore, an example of how the transmittance of the three colors changes when white light is irradiated has been described above. However, the present invention is not limited to such an example. The change rate can be obtained using light in a specific wavelength.

Returning to FIG. 8, the color correction is described in detail. As described above with reference to FIGS. 9A to 9C, with an increase in the accumulated exposure time, light receiving portions corresponding to color filters cannot obtain appropriate blue, green, red color information. It is not possible to completely correct degraded colors, however, white balance adjustment as one example of color correction is effective to prevent different colors transmitting the color filters dedicated to have specific colors transmit therethrough and to prevent a reduction in light receiving amount of a specific color only. By white balance adjustment, the overall tone of an image can be adjusted.

Figure 8:
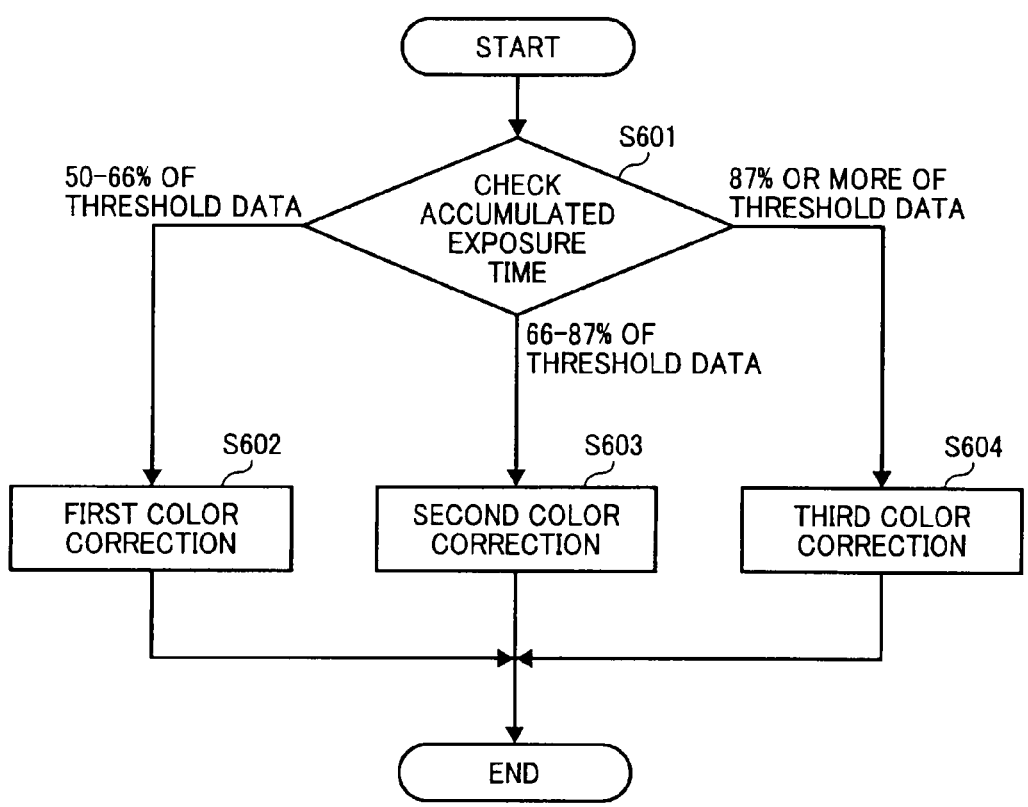
FIG. 8 is a flowchart showing a detailed example of the image color correction process of the camera device.

To deal with a transmittance change shown in FIG. 9A, that is, transmittance rising in order of blue, green, red, the color correction is performed to reduce the color outputs in order of steps S602, S603, S604 of FIG. 8. For example, in step S602 the color tone of an image is adjusted by white balance correction to prevent generation of a bluish image. Thus, changing correction amount of blue, green, and red colors in steps S602-604 in order and adjusting the color tone by white balance correction makes it possible to correct a degraded image.

To deal with a transmittance change in FIG. 9B, that is, transmittance decreasing in order of blue, green, red, the color correction is performed to increase the color outputs in order of steps S602, S603, S604 of FIG. 8. Further, to deal with a transmittance change in FIG. 9C, that is, transmittance decreasing in order of red, green, blue, the color correction is performed to increase the color outputs in order of steps S602, S603, S604 of FIG. 8.

Fourth Embodiment

Another example of a camera device comprising a lens unit and a camera body is described. In the present embodiment, the camera device is configured that the imaging portion 13 is disposed in the camera body 2 instead of the lens unit 1 in the first embodiment (FIG. 3), and the image processor 14, the storage medium 15 and the CPU 16 are excluded from the lens unit 1. The lens unit 1 comprises the optical system 11, the diaphragm controller 12 and the communication I/F 17 only. Thus, the threshold data, replacement flag and degradation flag are all stored in the storage medium 23 of the camera body 2, which allows the camera body 2 to control and manage the image sensor.

In such a camera device the shutter does not need to be included in the diaphragm controller 12, and can be provided in the camera body 2 instead. The shutter in the camera body 2 can be a focal plane shutter or a quick return mirror using a pentaprism.

The camera device according to the present embodiment needs a diaphragm-value detector to detect a level of diaphragm of the lens unit 1. The diaphragm-value detector can be made of a predetermined sensor to transfer diaphragm data to the camera body 2 via the communication interface 17. Further, the camera body can obtain the maximum aperture not only via electric communication but also by including a mechanical interlocking pin or the like as a diaphragm-value detector.

With such a change in the elements of the lens unit, the camera device according to the present embodiment can manage the accumulated exposure time of the image sensor of the camera body 2. However, since amount of light incident on the image sensor is not constant as described in the first embodiment, actual exposure time should be calculated by the expression in the first embodiment. Also, threshold data setting and color correction can be performed the same as in the above embodiments.

According to one embodiment of the present invention, to determine degradation of the image sensors by exposure, the accumulated exposure time and limit exposure time are stored for each image sensor. When the accumulated exposure time exceeds the limit exposure time, the camera device is controlled to stop operating and display a message to alert a user of replacement of the image sensor, making it possible for the user to appropriately manage the image sensor.

Moreover, to accurately determine a level of degradation of the image sensor, the actual exposure time is corrected in accordance with a reference exposure set along with the limit exposure time. Degradation of the image sensor is determined from the corrected accumulated exposure time so that it is able to manage time for replacement of the image sensor more properly.

Moreover, when the accumulated exposure time exceeds the limit exposure time, the camera device according to one embodiment of the present invention can display a message to notify a user of that. This makes it possible for the user to consider when to replace the image sensor in good time.

Moreover, the camera device according to one embodiment of the present invention is configured to include a storage medium and a determiner portion in the camera body. This allows a proper management of the image sensor of the camera body irrespective of a lens unit to be mounted on the camera body.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A camera device comprising a lens unit and a camera body detachable from the lens unit, comprising:
   a communication interface communicably connecting the lens unit and the camera body;
   the lens unit comprising
      an optical system including a lens;
      a diaphragm controller which operates a shutter and controls a diaphragm amount;
      an imaging portion including an image sensor which photo-electrically converts light from a subject having transmitted through the lens;
      an image processor which generates image data from an output of the imaging portion; and
      a storage medium in which an accumulated exposure time and a limit exposure time of the image sensor are stored, the accumulated exposure time being a time from a shutter opening to a shutter closing cumulatively added, the limit exposure time to indicate a degradation of the image sensor;
   the camera body comprising
      a determiner portion which determines the degradation of the image sensor by determining whether or not the accumulated exposure time is over the limit exposure time; and
      a notifying portion which notifies that the accumulated exposure time is over the limit exposure time when the determiner portion determines that the accumulated exposure time is over the limit exposure time.

2. A camera device according to claim 1, wherein:
   the lens unit further comprises a corrective calculator which calculates a corrected exposure time by correcting the accumulated exposure time based on an amount of light exposed to the image sensor; and
   when determining whether or not the accumulated exposure time is over the limit exposure time, the determiner portion uses the corrected exposure time as the accumulated exposure time.

3. A camera device according to claim 1, wherein the camera body further comprises a storage medium in which an accumulated exposure time and a limit exposure time of the image sensor are stored, the accumulated exposure time being a time obtained by adding a time for which the shutter is open.

4. A camera device according to claim 3, wherein the camera body further comprises a corrective calculator which calculates a corrected exposure time by correcting the accumulated exposure time based on an amount of light exposed to the image sensor.

5. A camera device according to claim 1, wherein:
   the limit exposure time is a first limit exposure time and a second limit exposure time;
   when the determiner portion determines that the accumulated exposure time is over the first limit exposure time, the image processor executes a color correction processing on captured image data; and
   when the determiner portion determines that the accumulated exposure time is over the second limit exposure time, the imaging portion stops operating.

6. A camera device according to claim 5, wherein the color correction processing is a white balance processing.

7. A camera device according to claim 1, wherein the camera body further comprises a display unit which displays a result of determination by the determiner portion.

8. A lens unit which is detachable from a camera body, comprising:
   a communication interface communicably connecting the lens unit and the camera body;
   an optical system including a lens;
   a diaphragm control which operates a shutter and controls a diaphragm amount;
   an imaging portion including an image sensor which photo-electrically converts light from a subject having transmitted through the lens;
   an image processor which generates image data from an output of the imaging portion; and
   a storage medium in which an accumulated exposure time and a limit exposure time of the image sensor are stored, the accumulated exposure time being a time from a shutter opening to a shutter closing cumulatively added, the limit exposure time to indicate a degradation of the image sensor;

a determiner portion which determines the degradation of the image sensor by determining whether or not the accumulated exposure time is over the limit exposure time; and a notifying portion which notifies that the accumulated exposure time is over the limit exposure time when the determiner portion determines that the accumulated exposure time is over the limit exposure time.

9. A camera body which is detachable from a lens unit, comprising:

a communication interface communicably connecting the lens unit and the camera body;

a storage medium in which an accumulated exposure time and a limit exposure time of the image sensor are stored, the accumulated exposure time being a time from a shutter opening to a shutter closing cumulatively added, the limit exposure time to indicate a degradation of the image sensor;

a determiner portion which determines the degradation of the image sensor by determining whether or not the accumulated exposure time is over the limit exposure time; and a notifying portion which notifies that the accumulated exposure time is over the limit exposure time when the determiner portion determines that the accumulated exposure time is over the limit exposure time.

* * * * *